Sept. 4, 1945.  H. N. RIDER  2,384,342
VALVE
Filed July 7, 1944
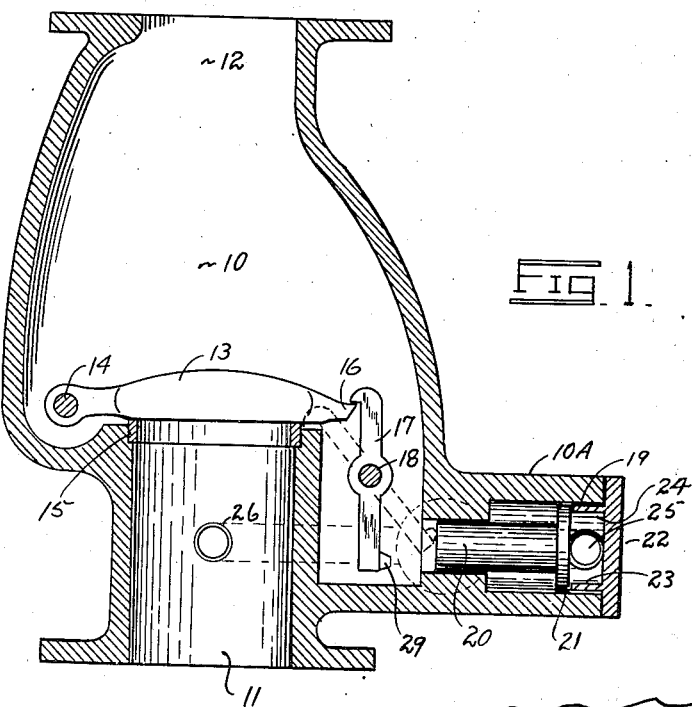
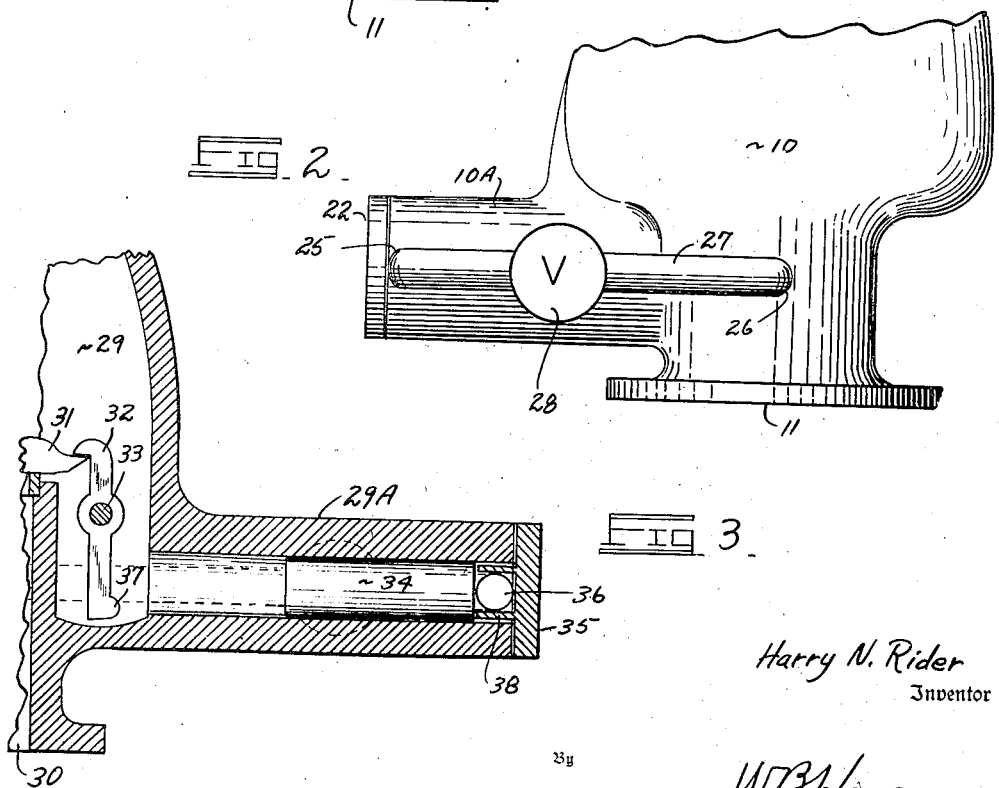
Harry N. Rider
Inventor
W. B. Harpman
Attorney Patented Sept. 4, 1945

2,384,342

UNITED STATES PATENT OFFICE 2,384,342

VALVE

Harry N. Rider, Youngstown, Ohio, assignor to "Automatic" Sprinkler Company of America, Youngstown, Ohio, a corporation of Delaware Application July 7, 1944, Serial No. 543,816

6 Claims. (Cl. 169—19)

This invention relates to a valve and more particularly to a pressure actuated valve adapted for fluid control.

The principal object of the invention is the provision of a valve wherein fluid pressure normally controlled by the valve is utilized to effect the quick opening thereof.

A further object of the invention is the provision of a fluid pressure actuated valve incorporating means for utilizing fluid pressure in initiating a mechanical action employed to release the valve element of the said valve.

A still further object of the invention is the provision of a fluid controlled valve capable of actuation by an automatic valve mechanism.

A still further object of the invention is the provision of a valve incorporating means for resetting the valve unlatching mechanism.

The fluid valve shown and described herein has been designed to form an efficient and dependable means of controlling the flow of fluid, such as fire extinguishing fluid, in a communication line such as a riser of a fire extinguishing system. The valve is so formed that a valve element normally closed therein is held in closed position by a movable latch. Mechanism is provided in the valve body for the actuation of the movable latch by the direction thereagainst of a mechanical force. The mechanical force employed for releasing the valve element latch is applied by a mechanism wherein movement is initiated by the application of the fluid force thereto, the movement utilized being in the form of the applied fluid force plus the accumulated momentum of the mechanical means employed.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a cross sectional side elevation of the valve.

Figure 2 is a partial side elevation of the reverse side of the valve illustrated in Figure 1.

Figure 3 is a partial side elevation of a valve illustrating a modification in the valve element releasing means.

By referring to the drawings and Figures 1 and 2 in particular it will be seen that a fluid control valve has been illustrated which consists of a valve body 10 having an inlet 11 and an outlet 12. A clapper 13 is pivotally affixed to the valve body by means of a pivot pin 14 and the clapper 13 is adapted to seat upon a seat ring 15 and thereby control the said inlet 11. The clapper 13 is provided with a projection 16 which is adapted to be held by an appropriately shaped latch 17 which is positioned in the valve body 10 by means of a pivot pin 18 in a manner so that it is capable of movement.

In order that movement can be imparted to the latch 17 so as to move it with respect to the projection 16 of the clapper 13 and thereby permit the clapper 13 to be opened by fluid pressure in the inlet 11 of the valve, means is provided which includes a body extension 10A forming a cylinder 19 for the reception of a piston 20 which is provided with an enlarged head 21. The cylinder 19 is formed in two diameters to accommodate the piston 20 and its head 19. The piston 20 is positioned freely in the cylinder 19 so that it may move readily with respect thereto and is, therefore, preferably formed of a material capable of resisting rust, corrosion and the deposit of foreign materials thereon. A cap 22 is positioned on the body extension 10A and is provided with inwardly directed lugs 23 which serve to limit the travel of the piston 20 so as to provide a chamber 24 beneath the cap 22. An inlet orifice 25 in the cylinder 19 is placed in communication with an outlet orifice 26 formed in the inlet 11 of the valve body by means of a tubular member 27. The tubular member 27 is controlled by an automatic valve 28 capable of remote actuation. (See Figure 2.)

By referring again to Figure 1 of the drawings it will be observed that the lowermost portion of the latch 17 is preferably formed with an offset 29 adapted to be struck by the piston 20 at such time as the same is moved rapidly to the left in Figure 1 as by the introduction of fluid pressure into the chamber 24. It will be observed that the formation of the actuating means permits the piston 20 to travel prior to engaging the offset 29 on the latch 17 so as to impart striking movement thereto and thus move the upper opposite end of the latch 17 off of the projection 16 of the clapper 13 thereby releasing the same. This construction results in the application of two forces to the latch structure thereby insuring its operation. One of these forces is the force of the fluid pressure from the inlet 11 of the valve as applied against the head 21 of the piston 20 and the other is the momentum accumulated by the piston 20, which is of relatively large size, the combined forces being sufficient to insure movement of the latch 17 and hence the release of the clapper 13. It will thus be seen that when the valve illustrated and described herein is subject to the control of a remotely positioned apparatus capable of actuating the automatic valve 28 the valve mechanism will automatically and positively release the clapper 13 thereby permitting the fluid in the inlet 11 to enter the body 10 and hence any sprinkler piping in communication with the outlet 12 thereof.

Still referring to Figure 1 of the drawing it will be seen that means for resetting the valve actuating mechanism has been provided in the formation of the latch 17, it being only necessary to open the hand hole cover of the valve 10 (not shown) and manually move the latch 17 into the position illustrated in dotted lines in Figure 1 to cause the lower end of the latch 17 to move the piston 20 to the right and hence back into the cylinder 19. When this has been accomplished the latch 17 is allowed to return to its normal vertical or near vertical position at which time the clapper 13 can be closed, the formation of the projection 16 thereof being so designed that it will move the latch 17 momentarily and then be retained beneath the upper end of the latch 17. The valve hand hole cover (not shown) is then replaced and the valve is ready for subsequent operation.

By referring to Figure 3 of the drawing it will be seen that a modified valve actuating mechanism has been illustrated in connection with a valve body 29 having an inlet 30 and a clapper 31 normally closed controlling the said inlet. A latch 32 engages a projection on the clapper 31 and is movably positioned in the valve body 29 by means of a pivot 33. A cylindrical extension 29A is relatively longer than the cylindrical extension 10A of the body 10 of the valve illustrated in Figure 1, and is adapted to receive in a readily slidable manner a piston 34. A cap 35 is provided to enclose the outermost end of the cylindrical body extension 29A and an inlet orifice 36 communicates with the interior of the cylindrical body 29A adjacent the cap 35. Fluid from the inlet 30 of the valve 29 is intended to be introduced through the inlet 36 in exactly the same manner as heretofore described in connection with the valve illustrated in Figures 1 and 2, the communication channel through which the fluid is introduced being under the control of an automatic valve capable of remote actuation. The modification comprises the formation of the piston 34 as a member of uniform diameter throughout its length. In use, the introduction of fluid into the cylindrical body 29A through the inlet orifice 36 serves to drive the piston 34 to the left so that it strikes a projection 37 on the lowermost end of the latch 32 thereby imparting striking movement to the latch 32 sufficient to cause it to move and thus release the clapper 31 so that fluid pressure in the inlet 31 of the valve 29 may raise the clapper 31 and flow through the valve. The force applied to the latch 32 in this modified valve construction is primarily that of the momentum of the moving piston 34. An inwardly extending projection 38 is formed on the cap 35 to limit the movement of the piston 34 with respect to the right hand end of the cylindrical body member 29A so that it cannot block the inlet orifice and hence render itself inoperative.

It will thus be seen that a modified formation of the valve illustrated in Figure 1 and heretofore described has been disclosed in Figure 3 wherein the formation of the actuating mechanism results in the practical dependency of the valve for actuation upon the momentum of the piston 34, the momentum being applied thereto by the fluid pressure from the inlet 30 of the valve.

Having thus described my invention, what I claim is:

1. A fluid control valve comprising a valve body having a clapper hinged therein adapted to close a passageway therethrough, latch means normally engaging the said clapper so as to retain it in closed position, means to release said latch, means establishing communication between the inlet portion of the said passageway and the said latch releasing means, and means controlling the said communication means.

2. A fluid control valve comprising a valve body having a clapper hinged therein adapted to close a passageway therethrough, latch means normally engaging the said clapper so as to retain it in closed position, means to release said latch, means establishing communication between the inlet portion of the said passageway and the said latch releasing means, and means controlling the said communication means, said latch releasing means including a cylinder having a piston movably positioned therein in alignment with said latch.

3. A pressure actuated valve comprising in combination a valve body having an inlet portion and an outlet portion with a communication channel therebetween, a movably positioned clapper adapted to close the said communication channel, a movable latch member adapted to retain the clapper in closed position, a fluid pressure actuated means including a piston for releasing the said movable latch, and means for directing fluid pressure from the said inlet portion against the said piston so as to move the same and thereby unlatch the said clapper.

4. A pressure actuated valve comprising in combination a valve body having an inlet portion and an outlet portion with a communication channel therebetween, a movably positioned hinged clapper adapted to close the said communication channel, a latch adapted to normally retain the clapper in closed position, and fluid pressure actuated means for moving the said latch so as to unlatch the said clapper, said fluid pressure actuated means comprising a piston in a cylinder formed in the valve body adjacent the said latch, the said piston adapted to be moved into engagement with the said latch, means establishing communication between the said cylinder and the said inlet portion of the said valve body, and a normally closed automatic valve in said communication means so that upon the opening thereof the pressure therein is directed into the said cylinder and against the said piston to move the said latch and thereby release the said clapper.

5. A pressure actuated valve comprising in combination a valve body having an inlet portion and an outlet portion with a communication channel therebetween, a movably positioned clapper adapted to close the said communication channel, a movable latch member adapted to retain the clapper in closed position, means for moving the latch member away from the said clapper, and means for establishing communication between the inlet portion of the said valve body and the said latch moving means and for controlling the same.

6. A pressure actuated valve comprising in combination a valve body having an inlet portion and an outlet portion with a communication channel therebetween, a movably positioned clapper adapted to close the said communication channel, a movable latch member adapted to retain the clapper in closed position, a fluid pressure actuated means including a piston for releasing the said movable latch, and means for directing fluid pressure from the said inlet portion against the said piston so as to move the same and thereby unlatch the said clapper, the said movable latch comprising a vertically positioned lever pivotally mounted in the said valve body and having an offset at the uppermost end for engaging the said clapper and an offset on the lowermost end for engaging the said piston so that it can be used for manually resetting the said piston for subsequent operation.

HARRY N. RIDER.